3,121,758
DEHYDRATION OF ALCOHOLS

Paul N. Rylander, Newark, and Martin J. Kilroy, Caldwell Township, N.J., assignors to Engelhard Industries, Inc., Newark, N.J., a corporation of Delaware
No Drawing. Filed May 26, 1960, Ser. No. 31,796
4 Claims. (Cl. 260—682)

This invention relates to the dehydration of alcohols and, more particularly, relates to the dehydration of alcohols to olefins using an osmium catalyst.

In accordance with the present invention, it has been found that an osmium catalyst dehydrates alcohols to olefins; for example, cyclohexanol is dehydrated to cyclohexane, instead of being dehydrogenated to cyclohexanone or phenol, as occurs with other active platinum metal catalysts.

The usual dehydration catalyst employed in commercial operations is alumina, but the osmium catalyst of the present invention exhibits a much greater dehydration activity, at relatively lower temperatures.

When using osmium as a catalyst, however, certain precautions must be observed. For example, osmium is volatile upon heating at low temperature in air. Massive osmium volatilizes as the tetroxide at temperatures as low as 100–150° C. The other platinum group metals require much higher temperatures for volatilization in the presence of air. If an osmium catalyst is heated in the presence of oxygen, there exists the following possibilities: (1) loss of the valuable active metal as the tetroxide; (2) loss of activity of the remaining carrier as a result of the removal of the osmium; (3) injury to personnel from the volatile osmium tetroxide, including the possibility of serious injury to the eyes. It is therefore necessary to operate, using osmium catalysts, in the absence of oxygen. If nitrogen is used as an inert gas during the heating period of the catalyst, as described in the example below, precautions should be observed to insure that the oxygen content thereof is very low, even at the beginning of the heating.

An important superiority of the osmium catalyst over the alumina catalyst formerly employed in dehydration reactions is the fact that the osmium catalyst is operative at much lower temperatures so that easily decomposed alcohols, which can not be dehydrated with alumina without extensive side-reactions, may be successfully dehydrated using osmium as the dehydration catalyst.

In the process of the present invention, the alcohol is dehydrated by passing it over a supported osmium catalyst which may be, for example, osmium metal supported on carbon. Other supports which may be used are activated alumina, silica gel, asbestos, magnesium carbonate, calcium carbonate, barium sulfate, kieselguhr, zirconium oxide, titanium dioxide and other similar catalyst supports. Carbon is preferred, however, since catalytic activity is high and the production of side reaction products is minimized.

The operating pressure may be in the range of 0.01 atmosphere to 100 atmospheres, preferably 0.1 atmosphere to 10 atmospheres and the operating temperature may be in the range of about 100° to 500° C., in the case of cyclohexanol preferably 200 to 300° C. For continuous reactions the space velocity may be in the range of about 50 to 50,000 standard volumes of gas per volume of catalyst per hour, preferably 500 to 2,000 standard volumes per volume per hour.

The quantity of osmium on the support may be in the range of about 0.01 to 5 percent, preferably 0.5 to 2 percent of the total weight of the catalytic metal and support. The catalytic metal may be deposited on the carrier by any one of a variety of known processes for preparing such catalysts.

Among the alcohols which may be dehydrated in accordance with the present invention are cyclohexanol, methylcyclohexanol, cyclopentanol, cyclobutanol, cycloheptanol, n-butanol, isobutanol, tert. butanol, pentanol and hexanol.

The invention will be further illustrated by the following specific example:

EXAMPLE I

Cyclohexanol was vaporized at atmospheric pressure and the vapor thereof was passed over a series of catalysts.

The equipment used in this investigation included a vertical Pyrex reactor, having an internal diameter of 1-inch and having a 14-inch length wrapped with a resistance heater. An 8-inch length of glass tubing was mounted above the heated section. Inside of the heated reactor was a 1.5-inch bed of granular alpha alumina, on top of this was a 3-inch bed of catalyst, and above the catalyst was an additional 9.5-inch bed of alpha alumina. A thermocouple extended down from the closed upper end of the tube to the middle of the catalyst bed. At the top of the tube were two side arms, one to a source of purge gas and the other to a Milton Roy constant delivery minipump. Below the reactor was connected an air condenser with a tap-off valve to remove condensate from the bottom thereof, an inner annular tube to conduct the product to the lower portion of the air condenser, and an outlet tube from the upper portion of the condenser. The uncondensed product was conveyed to a solid carbon dioxide condenser consisting of a receptacle for solid carbon dioxide, open at the top, and with a narrow space around it for condensation of the product gas. Below the solid carbon dioxide condenser, a flask was connected to receive the condensed product, and the upper end of the product space of the condenser led to a bleed-off for uncondensed gas.

In a test run, a highly purified nitrogen purge gas was admitted to the system above the reactor at a rate of 10 liters per hour; the purge gas was then run through the reactor and the condenser to the solid carbon dioxide condenser bleed-off. Meanwhile, the reactor was heated to the desired temperature. Then liquid cyclohexanol was admitted to the top of the reactor, at a rate of 50 ml. per hour, and dropped in a fine stream onto the heated alpha alumina above the catalyst.

Cyclohexanol vapor was thus passed downwardly over the catalyst, and below the reactor the product was partly liquefied in the air condenser. Where the product was chiefly cyclohexanone or unreacted cyclohexanol, most of it liquefied in the air condenser, since the boiling points of these two compounds are 157 and 161° C., respectively. However, where a large yield of cyclohexene was produced by reaction over the catalyst, most of it condensed in the solid carbon dioxide condenser, since the cyclohexene has a boiling point of 83° C. When much liquefaction occurs in this condenser, the cooled liquid in the flask, at a temperature of 0° C. or below, causes an ice deposit from the atmosphere in a thick layer around the flask.

An infrared analysis of the total product was made. A 10 percent solution of a product sample in carbon tetrachloride was dried with anhydrous sodium sulfate and scanned over 2–15 m$\mu$ on a Perkin Elmer Model 21 Spectrophotometer, for products other than $C_6H_{10}$ and $C_6H_{10}O$. The sodium chloride cell size was 0.0106 centimeter.

The percentage of cyclohexene in the product was determined at 13.95 m$\mu$, percent cyclohexanone at 5.85 m$\mu$, and the percentage of cyclohexanol by difference.

The results are as follows:

| Temp., °C. | 1 percent Os/C 4-8 mesh | | | ⅛″ Activated Alumina Pellets | | |
|---|---|---|---|---|---|---|
| | Percent $C_6H_{10}$ | Percent $C_6H_{10}O$ | Percent $C_6H_{11}OH$ | Percent $C_6H_{10}$ | Percent $C_6H_{10}O$ | Percent $C_6H_{11}OH$ |
| 250 | 70 | 8 | 22 | 0 | 0 | 100 |
| 300 | | | | 4.4 | 1.5 | 94 |

From the foregoing, it is apparent that the 1 percent osmium on carbon catalyst is much more active as a dehydratnig agent than is activated alumina. The osmium catalyst is also active at a lower temperature than is the alumina.

It will be obvious to those skilled in the art that many modifications may be made within the scope of the present invention without departing from the spirit thereof, and the invention includes all such modifications.

What is claimed is:

1. A process for the dehydration of an alcohol to produce an olefin, which comprises passing the alcohol as sole reactant and in vapor phase over a supported osmium catalyst comprising metallic osmium supported on carbon at reaction temperature in the absence of oxygen, whereby an intramolecular dehydration of the alcohol is effected thereby producing the olefin.

2. A process for the dehydration of cyclohexanol to produce cyclohexene, which comprises passing the cyclohexanol as sole reactant and in vapor phase over a supported osmium catalyst comprising metallic osmium deposited on carbon at reaction temperature in the absence of oxygen, whereby an intramolecular dehydration of the cyclohexanol is effected thereby producing the cyclohexane.

3. A process according to claim 1 in which the alcohol is a cyclic alcohol.

4. A process for the dehydration of an alcohol to produce an olefin, which comprises passing the alcohol as sole reactant and in vapor phase over a supported osmium catalyst comprising metallic osmium supported on carbon at a temperture in the range of about 100° C.–500° C. in the absence of oxygen, whereby an intramolecular dehydration of the alcohol is effected thereby producing the olefin.

References Cited in the file of this patent

UNITED STATES PATENTS

| 1,400,959 | Koetschet | Dec. 20, 1921 |
| 2,876,254 | Jenner et al. | Mar. 3, 1959 |
| 2,909,568 | Gleim | Oct. 20, 1959 |